(12) United States Patent
Burbridge (10) Patent No.: US 10,897,506 B2
(45) Date of Patent: Jan. 19, 2021

(54) MANAGING PORT CONNECTIONS (71) Applicant: Hewlett Packard Enterprise Development LP, Houston, TX (US)

(72) Inventor: Matthew Jack Burbridge, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 38 days.

(21) Appl. No.: 15/305,317

(22) PCT Filed: Jul. 2, 2014

(86) PCT No.: PCT/US2014/045204
§ 371 (c)(1),
(2) Date: Oct. 19, 2016

(87) PCT Pub. No.: WO2016/003454
PCT Pub. Date: Jan. 7, 2016

(65) Prior Publication Data
US 2017/0041404 A1 Feb. 9, 2017

(51) Int. Cl.
*G06F 3/00* (2006.01)
*H04L 29/08* (2006.01)
(Continued)

(52) U.S. Cl.
CPC ............ *H04L 67/141* (2013.01); *H04L 43/08* (2013.01); *H04L 47/125* (2013.01); *H04L 47/70* (2013.01);
(Continued)

(58) Field of Classification Search
CPC ... H04L 67/141; H04L 43/08; H04L 43/0876; H04W 36/0033
(Continued)

(56) References Cited

U.S. PATENT DOCUMENTS 6,421,711 B1 * 7/2002 Blumenau ............. G06F 3/0605
709/213
6,473,424 B1 * 10/2002 DeJager .................. H04L 47/10
370/389

(Continued)

FOREIGN PATENT DOCUMENTS

CN 1987858 A 6/2007
CN 101809559 A 8/2010
(Continued)

OTHER PUBLICATIONS

"Com Port Redirector v.4"—Lantronix, Jul. 2006 http://www.lantronix.com/wp-content/uploads/pdf/Com-Port-Redirector_QS.pdf (Year: 2006).*

(Continued)

*Primary Examiner* — Randy A Scott
(74) *Attorney, Agent, or Firm* — Hewlett Packard Enterprise Patent Department (57) ABSTRACT

A system in accordance with an example includes a plurality of ports and a port manager. The port manager is to monitor quality of each of the plurality of ports. The port manager is to receive a connection request from a client device at a first port. The port manager is further to determine whether to instruct the client device to connect to a second port that is more suitable for the client device than the first port, based on the quality of the plurality of ports.

20 Claims, 7 Drawing Sheets

(51) Int. Cl.
| | |
|---|---|
| *H04L 29/06* | (2006.01) |
| *G06F 15/16* | (2006.01) |
| *H04L 12/26* | (2006.01) |
| *H04L 12/803* | (2013.01) |
| *H04L 12/931* | (2013.01) |
| *H04L 12/911* | (2013.01) |
| *H04L 29/12* | (2006.01) |

(52) U.S. Cl.
CPC ......... *H04L 49/50* (2013.01); *H04L 43/0823* (2013.01); *H04L 43/0888* (2013.01); *H04L 43/0894* (2013.01); *H04L 61/6063* (2013.01); *H04L 67/42* (2013.01)

(58) Field of Classification Search
USPC ....... 710/33, 36, 38; 709/223, 224, 226, 227
See application file for complete search history.

(56) References Cited

U.S. PATENT DOCUMENTS

| | | | |
|---|---|---|---|
| 6,775,230 | B1 | 8/2004 | Watanabe et al. |
| 6,976,134 | B1 | 12/2005 | Lolayekar et al. |
| 7,554,914 | B1 | 6/2009 | Li et al. |
| 7,657,613 | B1 | 2/2010 | Hanson et al. |
| 7,768,907 | B2 | 8/2010 | Hue et al. |
| 7,996,371 | B1 | 8/2011 | Deshmukh |
| 8,155,518 | B2 | 4/2012 | Young |
| 8,307,359 | B1 | 11/2012 | Brown et al. |
| 8,341,308 | B2 | 12/2012 | Allen et al. |
| 8,446,916 | B2 | 5/2013 | Aybay et al. |
| 8,488,456 | B2 | 7/2013 | Battestilli et al. |
| 8,621,029 | B1 | 12/2013 | Grier et al. |
| 8,626,967 | B1 * | 1/2014 | Naik ....................... G06F 13/14 710/31 |
| 9,113,406 | B2 * | 8/2015 | Kannan ................. H04W 48/20 |
| 9,521,085 | B1 | 12/2016 | Watson et al. |
| 2003/0198238 | A1 * | 10/2003 | Westby ................... H04L 49/90 370/402 |
| 2004/0078521 | A1 | 4/2004 | Hawks et al. |
| 2004/0207719 | A1 | 10/2004 | Tervo et al. |
| 2005/0210098 | A1 | 9/2005 | Nakamichi et al. |
| 2006/0056293 | A1 * | 3/2006 | Kumagai ................. H04L 43/00 370/229 |
| 2006/0265529 | A1 | 11/2006 | Kuik et al. |
| 2007/0156710 | A1 | 7/2007 | Kern et al. |
| 2007/0174851 | A1 | 7/2007 | Smart |
| 2007/0204265 | A1 * | 8/2007 | Oshins .................. G06F 9/4856 718/1 |
| 2007/0208836 | A1 | 9/2007 | Madnani et al. |
| 2008/0127199 | A1 | 5/2008 | Miki |
| 2009/0287898 | A1 * | 11/2009 | Hara ...................... G06F 3/0607 711/170 |
| 2009/0307378 | A1 | 12/2009 | Allen et al. |
| 2010/0076744 | A1 | 3/2010 | Gehr et al. |
| 2010/0198972 | A1 | 8/2010 | Umbehocker |
| 2010/0223404 | A1 * | 9/2010 | Butler .................. H04L 41/0806 710/38 |
| 2010/0223440 | A1 | 9/2010 | Goodwill et al. |
| 2010/0281207 | A1 | 11/2010 | Miller et al. |
| 2011/0182294 | A1 | 7/2011 | Sangyoung et al. |
| 2011/0228698 | A1 | 9/2011 | Kato et al. |
| 2011/0302339 | A1 | 12/2011 | Umezawa |
| 2011/0320706 | A1 * | 12/2011 | Nakajima ............ G06F 11/0727 711/114 |
| 2012/0284556 | A1 | 11/2012 | Akirav et al. |
| 2012/0303701 | A1 | 11/2012 | Singh et al. |
| 2013/0054927 | A1 | 2/2013 | Raj et al. |
| 2013/0091102 | A1 | 4/2013 | Nayak |
| 2013/0173784 | A1 | 7/2013 | Wang et al. |
| 2013/0308455 | A1 | 11/2013 | Kapadia et al. |
| 2013/0339319 | A1 | 12/2013 | Woodward et al. |
| 2014/0095742 | A1 | 4/2014 | Guok et al. |
| 2014/0140216 | A1 | 5/2014 | Liu et al. |
| 2015/0036684 | A1 | 2/2015 | Modi et al. |
| 2015/0261696 | A1 | 9/2015 | Christian et al. |
| 2015/0331775 | A1 | 11/2015 | Slik |

FOREIGN PATENT DOCUMENTS

| | | |
|---|---|---|
| CN | 102460371 A | 5/2012 |
| EP | 1131933 A2 | 9/2001 |
| WO | 2009/033074 A2 | 3/2009 |
| WO | 2017/023271 A1 | 2/2017 |

OTHER PUBLICATIONS

"Defining Targets/Initiators as Ports" —George Penokie, Tivoli Systems, Jan. 29, 2001 https://citeseerx.ist.psu.edu/viewdoc/download?doi=10.1.1.396.4484&rep=rep1&type=pdf (Year: 2001).*

Castillo, B. et al., "IBM PowerVM Getting Started Guide," IBM, International Technical Support Organization, Feb. 2012, (Research Paper), 104 pages.

Emulex, "Emulex Delivers High Performance to Data Reduplication Applications," Copyright 2010, Solutions Brief, 3 pages.

International Search Report & Written Opinion received in PCT Application No. PCT/US2014/054174, dated May 21, 2015, 9 pages.

International Search Report and Written Opinion received for PCT Application No. PCT/US2014/045204, dated Mar. 12, 2015, 11 pages.

Khazali, I. et al., "Load Balancing with Minimal Flow Remapping for Network Processors," (Research Paper), Computers and Communications (ISCC), 2012 IEEE Symposium on IEEE Jul. 1-4, 2012 pp. 662-666.

Parker, K. W., "SCSI Socket Services (SSS) Review Nov. 5, 1997, Project T10/1246-D," Nov. 11, 1997, 7 pages.

VMWare.com, "Path Management and Manual, or Static, Load Balancing", available online at <https://pubs.vmware.com/vsphere-4-esx-vcenter/index.jsp?topic=/com.vmware.vsphere.config_iscsi.doc_41/esx_san_config/managing_san_systems/c_path_management_and_manual_load_balancing.html>, retrieved on Oct. 16, 2018, 1 pages.

International Preliminary Report on Patentability received for PCT Patent Application No. PCT/US2014/054174, dated Mar. 16, 2017, 6 pages.

International Preliminary Report on Patentability received for PCT Patent Application No. PCT/US2014/045204, dated Jan. 12, 2017, 8 pages.

European Search Report and Search Opinion Received for EP Application No. 14901110.8, dated Apr. 4, 2018, 10 pages.

C. DeSanti et al., "Transmission of IPv6, IPv4, and Address Resolution Protocol (ARP) Packets over Fibre Channel", Network Working Group, Request for Comments (RFC) 4338, Jan. 2006.

Castets, G. A. et al., "IBM Enterprise Storage Server," IBM Redbooks, Sep. 2001, 364 pages.

Chandra Seetharaman, "Multipath Usage Guide," Oct. 22, 2009, Device-mapper and LVM2 Wiki, <http://www.sourceware.org/lvm2/wiki/MultipathUsageGuide>.

Christian Bandulet, "The Storage Evolution: From Blocks, Files and Objects to Object Storage Systems," 2007, <https://www.snia.org/sites/default/education/tutorials/2007/spring/storage/The_Storage_Evolution.pdf>.

Jim Hafner, "Suggested changes to OSD model in osd-r01," Jun. 28, 2000, to T10 Committee (SCSI), T10/00-262 revision 0, pp. 1-27.

M. Rajagopal et al., "Fibre Channel Over TCP/IP (FCIP)", Network Working Group, Request for Comments (RFC) 3821, Jul. 2004.

M. Rajagopal et al., "IP and ARP over Fibre Channel", Network Working Group, Request for Comments (RFC) 2625, Jun. 1999.

McDonald et al., "Object Storage 101," 2011, <https://www.snia.org/sites/default/files/Object_Storage_101.pdf>.

Paul at NoteableComputers.com, "ipfc," May 1, 2008, <https://web.archive.org/web/20080501080036/http://noteablecomputers.com/ipfc.txt>.

(56) References Cited

OTHER PUBLICATIONS

Server Fault, "Using SAN Fiber Channel network for TCP/IP, possible?," 2010-2012, <https://serverfault.com/questions/103013/using-san-fiber-channel-network-for-tcp-ip-possible>.
SNIA Object Storage Technical Working Group (TWG), "IP-Based Drive Management Specification," Version 1.0, Jan. 10, 2017, SNIA Technical Position.
Tate, J. et al., "SAM Multiprotocol Routing: An Introduction and Implementation," IBM Redbooks, Nov. 9, 2006, 78 pages.
Wikipedia, "Berkeley sockets," Aug. 14, 2014, <https://en.wikipedia.org/w/index.php?title=Berkeley_sockets&oldid=621230170>.
Wikipedia, "Fibre Channel over Ethernet," Aug. 29, 2014, <https://en.wikipedia.org/w/index.php?title=Fibre_Channel_over_Ethernet&oldid=623324638>.
Wikipedia, "IPFC," Mar. 14, 2013, <https://en.wikipedia.org/w/index.php?title=IPFC&oldid=544106037>.
Wikipedia, "Multipath I/O," Apr. 14, 2014, <https://en.wikipedia.org/w/index.php?title=Multipath_I/O&oldid=604114342>.
Wikipedia, "Network socket," Aug. 5, 2014 <https://en.wikipedia.org/w/index.php?title=Network_socket&oldid=619950618>.
Zheng, Ke, "The Research and Implementation of iSCSI and FC Link Integration in Storage Systems", Full text database of excellent master theses in the field of information technology in China, May 15, 2010, No. 05, 64 pages.
Datera, Inc., "Asymmetric Logical Unit Assignment," available online at <http://linux-iscsi.org/index.php?title=Asymmetric_Logical_Unit_Assignment&oldid=15477>, Oct. 9, 2013, 4 pages.
Duncan Epping, "What's that ALUA exactly?," available online at <www.yellow-bricks.com/2009/09/29/whats-that-alua-exactly/>, Sep. 29, 2009, 7 pages.
George Penokie, "SBC-3; SPC-4; SAM-5; SCSI Referrals," T10/09-241 revision 6, Jan. 18, 2010, pp. 1-30.
Keith W. Parker, "Diogenes' Unofficial SCSI Socket Services (SSS) web site," Sep. 11, 1998, 4 Pages.
Keith W. Parker, "SCSI Socket Services (SSS) Review Jul. 15, 1998," Project T10/1246-D, T10/98-191 revision 0, Jul. 15, 1998, pp. 1-3.
Roger Luethy, "ALUA (asymmetric logical unit access)," available online at <https://rogerluethy.wordpress.com/2010/07/18/alua-asymetric-logical-unit-access/>, Jul. 18, 2010, 4 pages.

* cited by examiner

MANAGING PORT CONNECTIONS

BACKGROUND

In a client-server data storage solution such as a distributed application structure that partitions tasks or workloads between the providers of a resource or service, called servers, and service requesters, called clients, one or more client devices can connect to a server to store and retrieve data.

BRIEF DESCRIPTION OF THE DRAWINGS

Some examples of the present application are described with respect to the following figures.

DETAILED DESCRIPTION

As users generate and consume greater amounts of data, the storage demands for these data also increase. Larger volumes of data become increasingly expensive, time consuming, and space consuming to store and access. Moreover, the amount of duplicate data, that is, data that is the same as previously existing data, is common. Such duplicate data further taxes storage resources. Data deduplication is an important technology in data storage solutions in order to decrease the total amount of disk space to store a certain amount of data, for example at a target device (e.g., a server).

As an example, consider 1000 client devices (e.g., personal computers) all backing up their operating system(s) (OS). Instead of keeping 1000 copies of the data corresponding to the OS, a deduplication technique would ensure that the server retains only one physical copy, although 1000 clients would effectively believe that the retained copy is private to them. Thus, deduplication refers to the process of identifying and eliminating redundancies in data storage. Deduplication can be achieved at the client-side, server-side, or both.

In a client-server data storage solution, a client device can connect to a server via a high-speed network technology such as fibre channel, transmission control protocol (TCP), user datagram protocol (UDP), or any other connection oriented protocol. Moreover, multiple network ports may be available at the server for load balancing.

The described examples provide a solution for the server to determine the quality (e.g., load, link speed, error rate, amount of traffic, bandwidth, transmission rate, etc.) on each port and instruct the client device on which port to use, based on the quality. For example, if the server determines that one port is busy then a different port can be used. Defining a mechanism to instruct the client to connect via a different port allows the server to distribute a number of connections over multiple ports and therefore make best use of the available ports. Furthermore, since the monitoring and decision making is performed by the server, and does not rely on monitoring of the ports by the client, this makes the client HBA (host bus adapter) agnostic as different HBAs report port usage in different ways. Thus the described solution works for HBAs that do not provide any port usage information. Moreover, if the client is able to monitor its own port usage and make a decision on which port to use based on the usage, then it is able to do so without affecting the validity or operation of the server managed port balancing.

Multiple network ports can be made available to the client devices for this purpose. For example, muttipath input/output (MPIO) is a mechanism for providing multiple paths to a target device, such as a server, for redundancy and load balancing, Unlike MPIO mechanism, the described solution does not require configuration of the client or that the server be MPIO aware. In addition, the described solution needs no additional load-balancing software or drivers on either the server or the client.

In one example, a system includes a plurality of ports and a port manager. The port manager is to monitor quality of each of the plurality of ports. The port manager is to receive a connection request from a client device at a first port. The port manager is further to determine whether to instruct the client device to connect to a second port that is more suitable for the client device than the first port, based on the quality of the plurality of ports.

In another example, a method includes monitoring, by a target device, quality of each of a plurality of ports of the target device. The method includes receiving a connection request to a first port of the plurality of ports from a client device. The method also includes determining whether to instruct the client device to connect to another port of the plurality of ports based on a determination that the other port has a higher quality than the first port.

In another example, a non-transitory machine-readable storage medium encoded with instructions executable by a process, the machine-readable storage medium includes instructions to monitor quality metrics for each of a plurality of port, instructions to receive a connection request to a first port from a client device, and instructions to instruct the client device to connect to another port based on a determination that the other port has a better quality metric than the first port.

Figure 1:
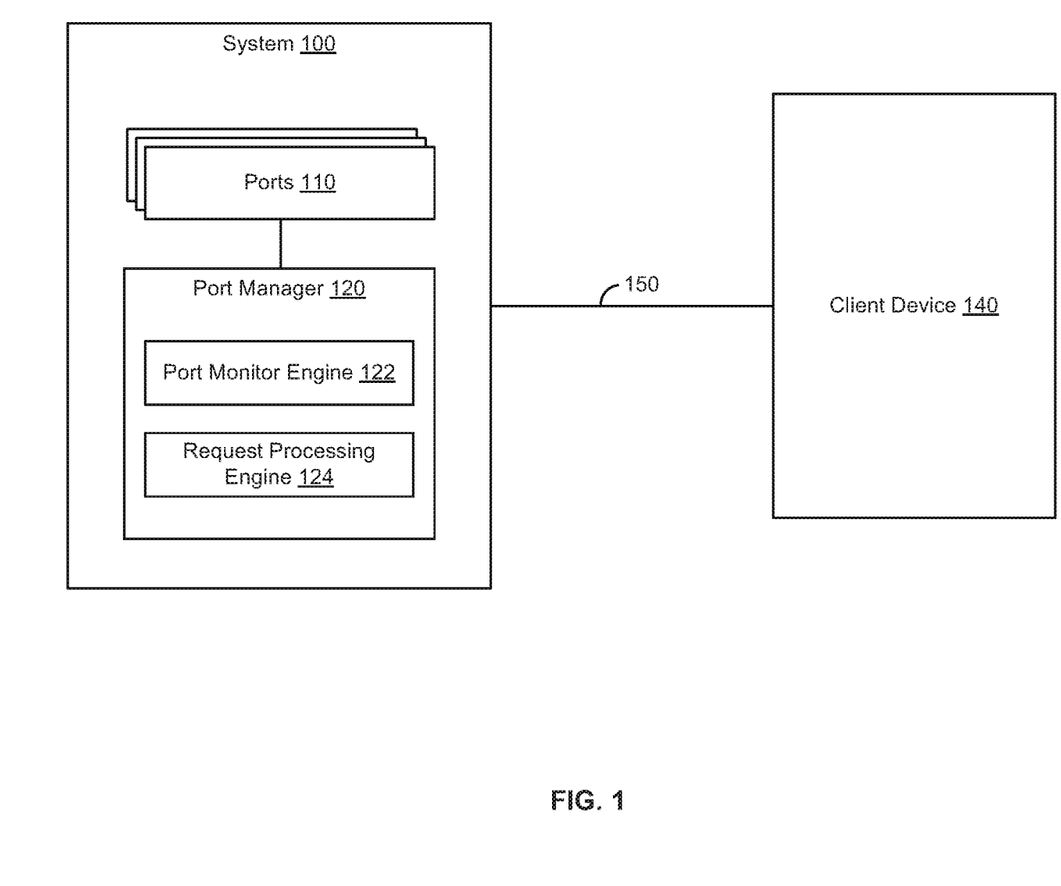
FIG. 1 illustrates an example of a system including a port manager to manage port connections.

Referring now to the figures, FIG. 1 is an example of a system including a port manager to manage port connections. System 100 can be a server, a database, a deduplication system, a storage system, or any other computing system. For example, system 100 can be server including, one or more storage devices (not shown) accessible to client device 140.

Client device 140 refers to a computing device through which one or more users may access the system 100. Thus, client device 140 may include any of a wide variety of computing systems, such as stand-alone personal desktop or laptop computers (PC), workstations, personal digital assistants (PDAs), smartphones, tablets, mobile devices, server computers, or appliances, for example. Client device 140 may include memory, storage, and a degree of data processing capability at least sufficient to manage a connection to the system 100 via a communication link 150. Thus, client 140 can initiate communication sessions with system 100.

Communication link 150 can be a network and/or direct connection, wired and/or wireless. Communication link 1150 may include one or more local area network (LAN) and/or wide area network (WAN) and/or storage area network (SAN). It should be noted that system 100 and client 140 can communicate over a link 150 on separate hardware, and/or both client 140 and system 100 may reside in the same system.

System 100 includes a plurality of ports 110 and a port manager 120. Ports 110 can be, for example, a fibre channel port, a TCP/IP port, a UPD/IP port, or any port associated with any connection oriented protocol. Port manager 120 can include a number of engines (e.g., port monitor engine 122 and request processing engine 124). Port manager 120 can include additional or fewer engines than illustrated to perform the various functions described herein.

The number of engines 122, 124 can include a combination of hardware and programming to perform a number of functions described herein (e.g., monitor quality of the ports 110). The programming can include program instructions (e.g., software, firmware, etc.) stored in a memory resource (e.g., computer-readable medium (CRM), machine-readable medium (MRM), etc. as well as hard-wired program (e.g., logic).

The port monitor engine 122 can include hardware and/or a combination of hardware and programming to monitor quality of each of the ports 110. In certain examples, port monitor engine 122 can monitor quality data such as amount of traffic, error rate, link speed, bandwidth, and transmission rate of each of the ports 110. As an example, the port monitor engine 122 may weigh each port 110 in terms of activity. In such an example, this may be a simple binary decision (e.g., port is not busy or port is busy), or some numerical value indicating the amount of traffic on each port (e.g., 0% if not busy up to 100% if fully utilized).

Request processing engine 124 can include hardware and/or a combination of hardware and programming to receive a connection request from client 140 at a first port, where first port is any of the plurality of ports 110. The connection request can include at least one of a port login (PLOGI) request and a process login (PRLI) request, or any other port connection request. In response to the connection request, request processing engine 124 can determine whether to instruct the client device to connect to a second port (i.e., another port from the plurality of ports 110) that is more suitable for the client device 140 than the first port. This determination is based on the quality of the plurality of ports 110 reported by the port monitor engine 122.

In some examples, the request processing engine 124 can accept the connection request at the first port if the first port has the best quality of the plurality of ports 110. In other examples, the request processing engine 124 can reject the connection request at the first port if the second port has a better quality then the first port, for example, where the second port is determined to have the best quality of all the ports 110. In such an example, the request processing engine 124 can provide the client 140 information usable by the client 140 to identify and connect with the second port. In yet other examples, the request processing engine 124 can accept the connection request at the first port if the client 140 indicates that a connection could not be established with the second port. In still other examples, the request processing engine 124 can instruct the client 140 to connect to the second port after connection to the first port has been established and the quality of the first port becomes less than the quality of the second port (e.g., due to increased traffic on the first port).

In certain examples, the port monitor engine 122 may monitor the quality of a subset of the ports 110. The subset of ports may be ports available and/or accessible to the client 140. In such an example, the subset can be identified based at least in part on data included by the client 140 in the connection request, such as world wide node name (WWNN), fibre channel identification (FM), and world wide port name (WWPN).

Figure 2:
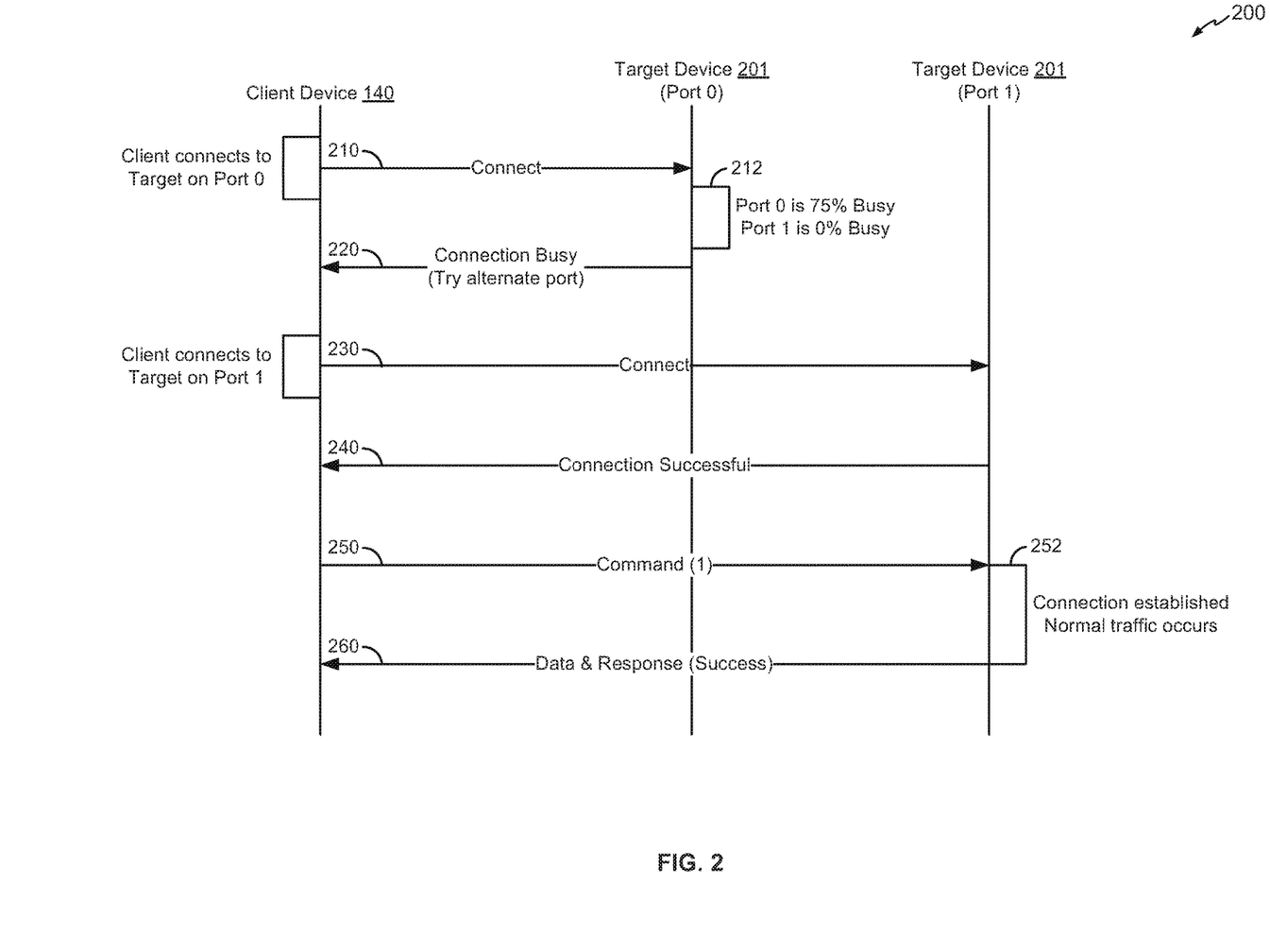
FIG. 2 illustrates an example of a communication flow between a client device and a target device.

FIG. 2 is an example of a communication flow between a client device and a target device. Flow diagram 200 includes the client device 140 and target device 201. Target device 201 can be, for example, a server having a plurality of ports such as ports 110 of FIG. 1. Flow diagram 200 includes Port 0 and Port 1 of target device 201. At 210, client device 140 can connect to target device 201 at Port 0. When the client 140 connects to target 201, target 201 can examine the ports 110 to determine if there is a port having a better quality than the port that the connection request was received on (i.e., Port 0). For illustrative purposes only, the quality of the ports 110 will be described in reference to port utilization (i.e., how busy a port is, or amount of traffic). However, it should be noted that the quality of the ports 110 can be determined based one or more of amount of traffic, error rate, link speed, bandwidth, transmission rate, or any other quality metric.

Thus, target 201 can determine if there is a port that is not as busy as Port 0 that the connection request was received on. At 212, target 201 may determine that Port 0 is 75% busy and that Port 1 is 0% busy. At 220, target 201 can reject the connection attempt at Port 0 and instruct the client 140 to connect via Port 1. At 230, client 140 can connect to target 201 on Port 1. At 240, a client 140 makes a successful connection at Port 1, and can communicate with target 201, at 252. For example, at 250 client 140 can issue a command and target 201 can respond and/or send data to client 140, at 260. If, however, Port 0 is the least busy then target 201 can accept the connection request and the connection is established.

Figure 3:
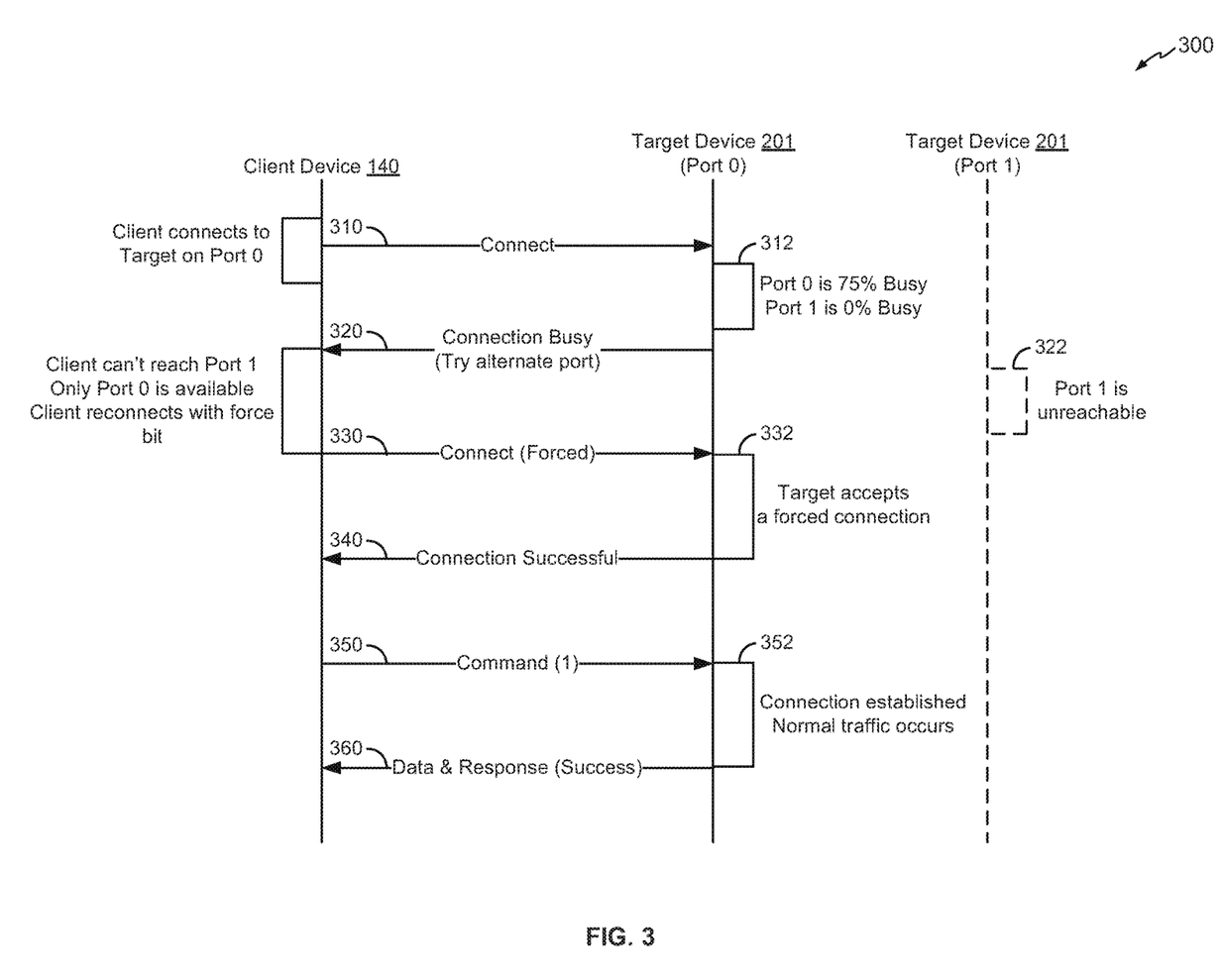
FIG. 3 illustrates another example of a communication flow between a client device and a target device.

FIG. 3 is another example of a communication flow between a client device and a target device. Flow diagram 300 includes client device 140 and target device 201, where target device 201 includes Port 0 and Port 1. At 310, client 140 can connect to target device 201 at Port 0. Target 201 can monitor the ports 110. For example, target 201 can monitor the ports 110 to determine if there is a port that is not as busy as Port 0. At 312, target 201 can determine that Port 0 is 75% busy and that Port 1 is 0% busy. At 320, target 201 can reject the connection attempt at Port 0 and instruct client 140 to connect via Port 1.

When client 140 receives the instruction to try another port, client 140 attempts to connect to the port indicated in the instruction (i.e., Port 1). Client 140 can repeat the connection process until either a connection attempt is successful at Port 1, or Port 1 is unreachable, at 322, it should be noted that in certain examples, client 140 can attempt to connect to a number of ports (including exhausting all ports). In the case where client 140 is unable to connect to Port 1 and/or all ports have been exhausted, client 140 can request a "forced" connection request at Port 0, at 330. For example, client 140 can request a connection at Port 0 and flag the request as a "forced" connection attempt, indicating that client 140 is unable to connect to any other ports (e.g., Port 1).

The forced connection attempt instructs target 201 to accept the connection request at Port 0, at 322, even if there is another port that is less busy than Port 0. Accordingly, this solution covers the possibility of the client 140 having access to a single port. Once client 140 has established a successful connection with target 201 at Port 1, at 340, client can communicate with target 201 using Port 0, at 352. For example, client can issue a command, at 350, and receive a response from target 201, at 360.

Figure 4:
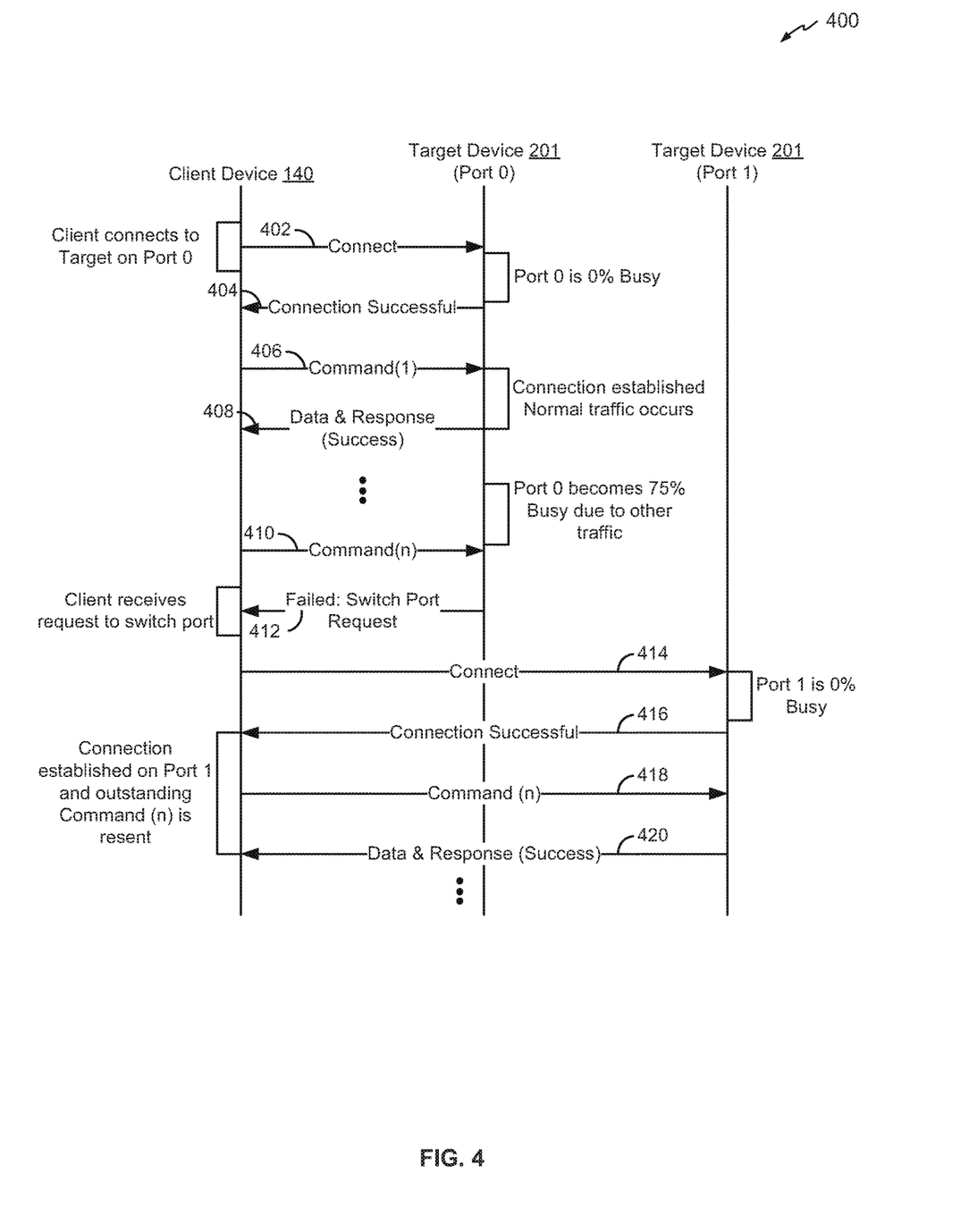
FIG. 4 illustrates another example of a communication flow between a client device and a target device.

FIG. 4 is another example of a communication flow between a client device and a target device. Flow diagram 400 includes client device 140 and target device 201, where target device 201 includes Port 0 and Port 1. At 402, client 140 can connect to target 201 at Port 0. Target 201 can monitor the ports 110 and can determine that Port 0 is 0% busy. Because Port 0 is 0% busy, at 404, target 201 can accept the connection request at Port 0. Accordingly, client 140 can communicate with target 201 via Port 0. For example, at 406, client 140 can send a command to target 201 and receive a response, at 408.

Communication between client 140 and target 201 can continue via Port 0 until target 201 determines that Port 0 has become 75% busy, for example, due to other traffic (e.g., connection or connectionless traffic such as SCSI Virtual Tape traffic). Accordingly, at 410, when client 140 attempts to send a command (e.g., Command (n)) to target 201 via Port 0, target 201 can respond to the command with a "switch port" instruction/request, at 412. On receipt of the "switch port" instruction, client 140 can reconnect with target 201 on another port (i.e., Port 1), at 414. When client 140 successfully connects to target 201 via Port 1, at 416, client 140 can resend the outstanding command (i.e., Command (n)) at 418, and receive a response, at 420.

Figure 5:
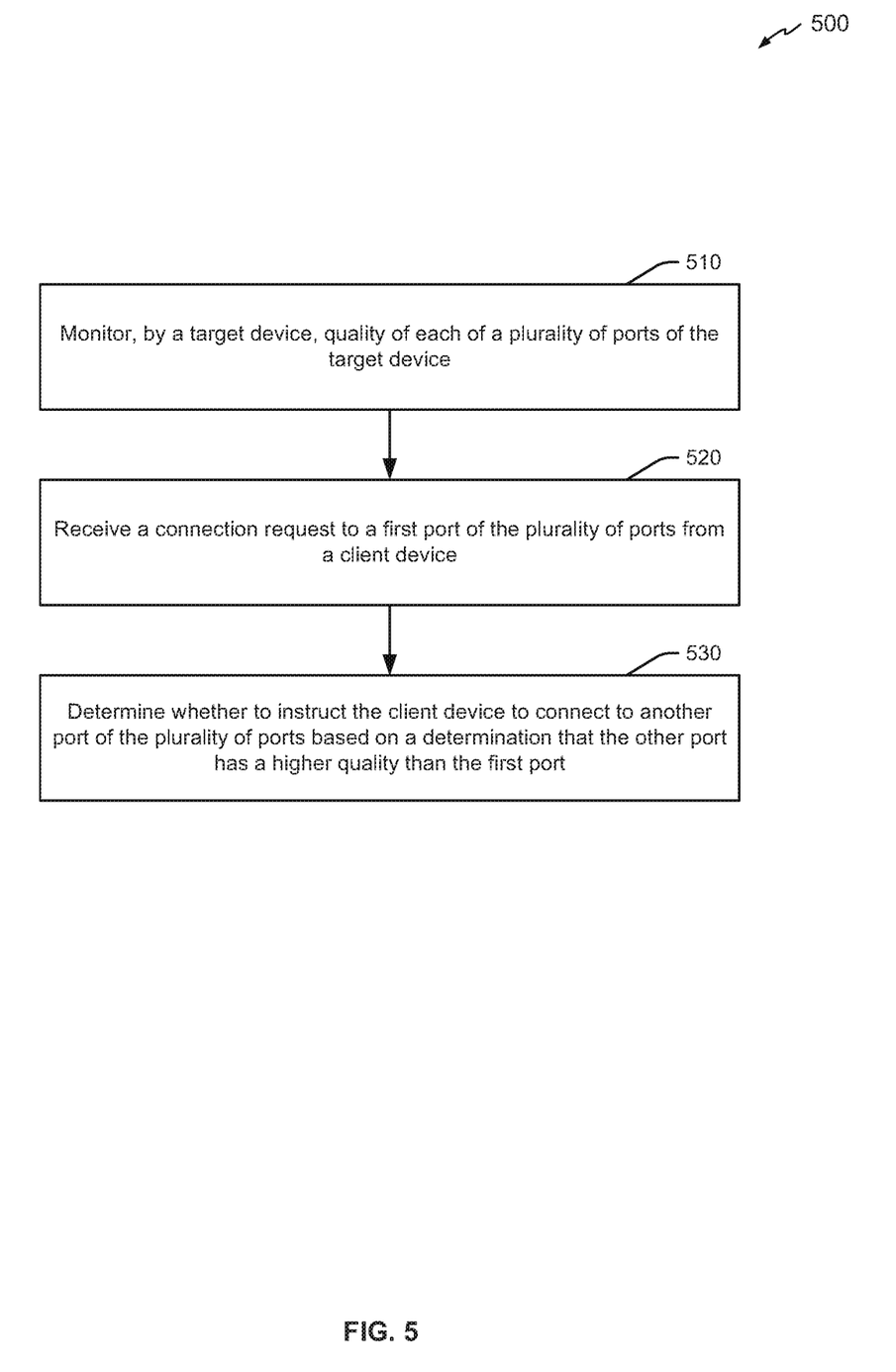
FIG. 5 is an example of a flowchart illustrating a method for managing port connections at a target device.

FIG. 5 is an example of a flowchart illustrating a method for managing port connections at a target device. Method 500 may be implemented, for example, in the form of executable instructions stored on a non-transitory computer-readable storage medium and/or in the form of electronic circuitry.

Method 500 includes monitoring, by a target device, quality of each of a plurality of ports of the target device, at 510, For example, port manager 120 can include a port monitor engine 122 to monitor the quality of ports 110. Quality can include, for example, amount of traffic, error rate, link speed, bandwidth, transmission rate, or any other quality metric of the plurality of ports.

Method 500 includes receiving a connection request to a first port of the plurality of ports from a client device, at 520. For example, port manager 120 can include a request processing, engine 124 to receive a connection request via one of the ports 110.

Method 500 includes determining whether to instruct the client device to connect to another port of the plurality of ports based on a determination that the other port has a higher quality than the first port, at 530. For example, request processing engine 124 can instruct the client 140 to connect to another port based on a determination, by the port monitor engine 122, that the other port has a higher quality than the first port. In some examples, the method 500 of FIG. 5 includes additional steps in addition to and/or in lieu of those depicted in FIG. 5.

Figure 6:
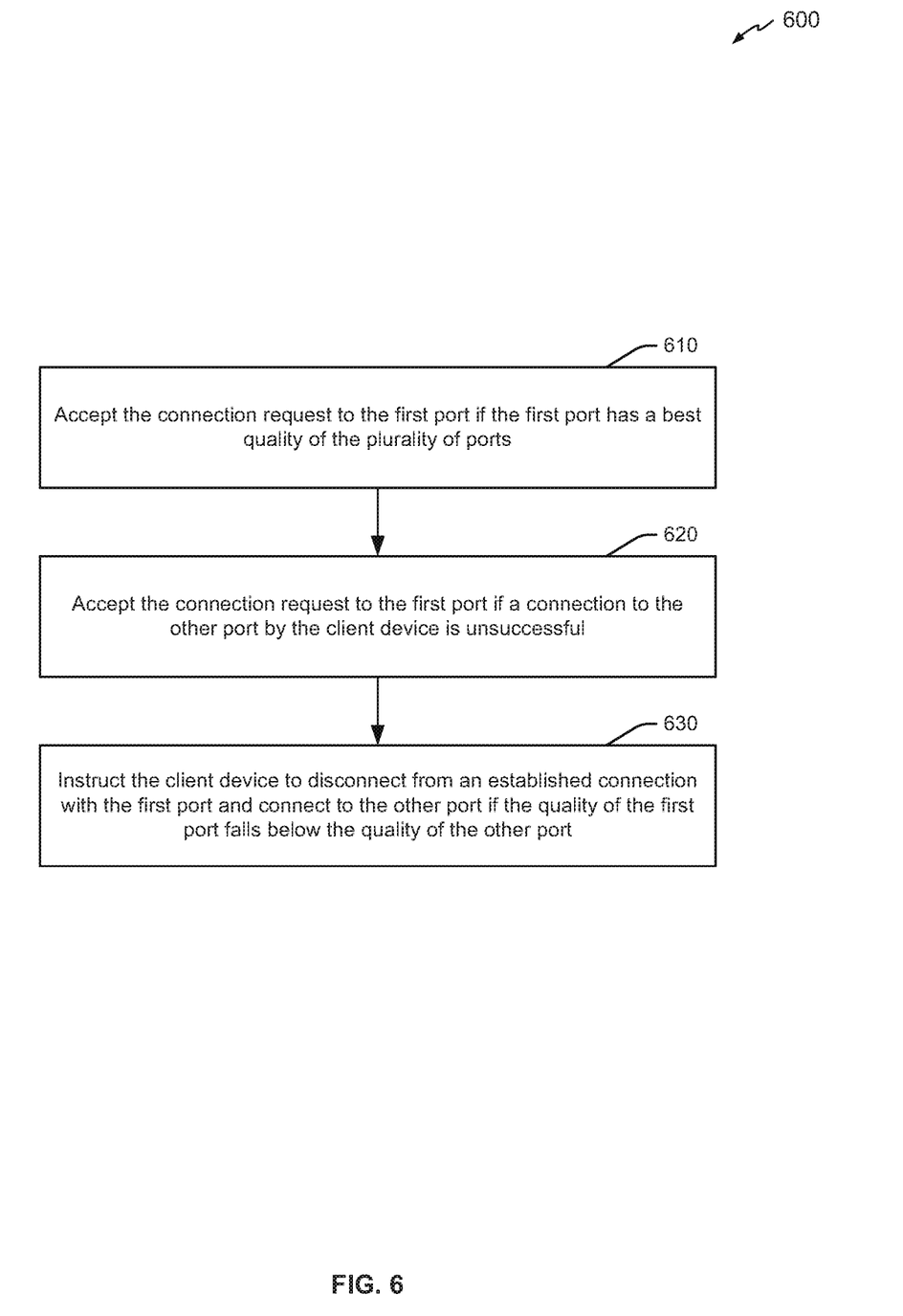
FIG. 6 is another example of a flowchart illustrating a method for managing port connections at a target device.

FIG. 6 is another example of a flowchart illustrating a method for managing port connections at a target device. Method 600 may be implemented, for example, in the form of executable instructions stored on a non-transitory computer-readable storage medium and/or in the form of electronic circuitry.

Method 600 includes accepting the connection request to the first port if the first port has a best quality of the plurality of ports, at 610. For example, the port manager 120 can accept the connection request to the first port if the port manager 120 determines that the first port has the best quality of the plurality of ports 110.

Method 600 includes accepting the connection request to the first port if a connection to the other port by the client device is unsuccessful, at 620. For example, the port manager 120 can accept a forced connection attempt by the client 140 if the client 140 is unable to connect to another port. This covers the possibility of the client 140 only having access to a single port, for example.

Method 600 includes instructing the client device to disconnect from an established connection with the first port and connect to the other port if the quality of the first port falls below the quality of the other port, at 630. For example, port manager 120 can instruct the client 140 to connect to another port, if after connection has been established with the first port, the quality of the first port falls below the quality of another port. Accordingly, established connection can be instructed to use another port. In some examples, the method 600 of FIG. 6 includes additional steps in addition to and/or in lieu of those depicted in FIG. 6.

Figure 7:
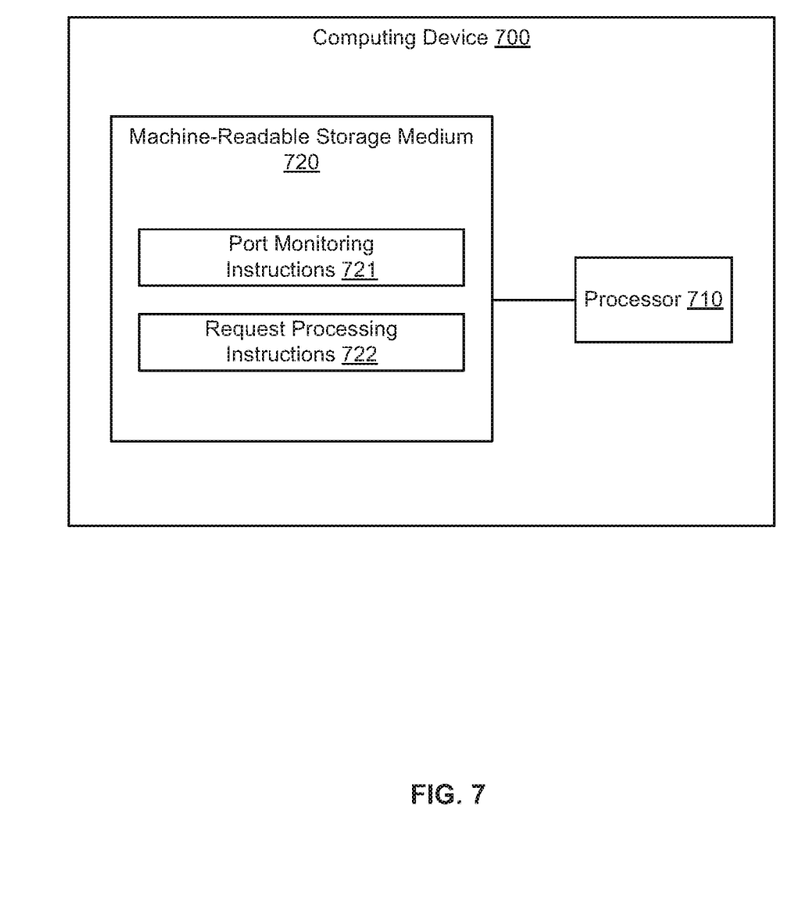
FIG. 7 illustrates an example of a computing device including a computer-readable medium having instructions to manage port connections.

FIG. 7 illustrates an example of a computing device including a computer-readable medium having instructions to manage port connections. Computing device 700 includes computer-readable storage medium 720. Computer-readable storage medium 720 includes instructions 721, 722 that, when executed by processor 710, cause the device 700 to perform the functionalities described herein.

Port monitoring instructions 721 include instructions to monitor quality metrics for each of a plurality of ports. The quality metrics may include, for example, amount of traffic, error rate, link speed, bandwidth, transmission rate, or any other quality metric of the ports.

Request processing instructions 722 include instructions to receive a connection request to a first port from a client device, and instructions to determine whether to instruct the client device to connect to another port based on a determination that the other port has a better quality metrics than the first port.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A target device, comprising:
   a plurality of ports; and
   a port manager comprising a combination of hardware and programming to:
   monitor quality of each of the plurality of ports of the target device;
   receive a connection request from a client device at a first port of the plurality of ports of the target device; and
   in response to the connection request from the client device at the first port of the target device:
   determine whether a second port of the plurality of ports of the target device is more suitable for the client device than the first port, based on the quality of the plurality of ports; and
   based on a determination that the second port is more suitable for the client device than the first port, based on the quality of the plurality of ports, reject the connection request from the client device at the first port of the target device and instruct the client device to connect to the second port of the target device.

2. The target device of claim 1, wherein the quality includes at least one of amount of traffic, error rate, link speed, bandwidth, and transmission rate of the ports.

3. The target device of claim 1, wherein the port manager is to, in response to the connection request from the client device at the first port, based on a determination that the first port has the best quality of the plurality of ports, accept the connection request at the first port.

4. The target device of claim 1, wherein the port manager is to, in response to the connection request from the client device at the first port, based on a determination that the second port has a better quality than the first port, reject the connection request at the first port.

5. The target device of claim 1, wherein the port manager is to, in response to the connection request from the client device at the first port, based on a determination that a connection could not be established with the second port, accept the connection request at the first port.

6. The target device of claim 1, wherein the port manager is to monitor the quality of a subset of the plurality of ports available to the client based on data included in the connection request from the client device, wherein the data includes at least one of world wide node name (WWNN), fibre channel identification (FCID), and world wide port name (WWPN).

7. The target device of claim 1, wherein the connection request includes at least one of a port login (PLOGI) request and a process login (PRLI) request.

8. The target device of claim 1, wherein the port manager is to provide the client device with information usable by the client device to identify and connect with the second port.

9. The target device of claim 1, wherein the plurality of ports include transport protocol ports, and wherein the transport protocol include fibre channel protocol (FCP), transmission control protocol (TCP), and user datagram protocol (UDP).

10. The target device of claim 1, wherein the port manager is to, in response to the connection request from the client device at the first port, after connection to the first port has been established and based on a determination that the quality of the first port becomes less than the quality of the second port, instruct the client device to connect to the second port.

11. The target device of claim 1, wherein the port manager does not rely on the client device to monitor the quality of each of the plurality of ports.

12. The target device of claim 1, wherein the port manager is further to:
   in response to the connection request from the client device to the first port:
   based on a determination that the first port has the best quality of the plurality of ports, accepting the connection request to the first port;
   based on a determination that connection to the other port is unsuccessful, accepting the connection request to the first port; and
   based on a determination that the quality of the first port falls below the quality of the other port, instructing the client device to disconnect from an established connection with the first port and connect to the other port.

13. A method, comprising:
   monitoring, by a target device, quality of each of a plurality of ports of the target device;
   receiving, with a the target device, a connection request to a first port of the plurality of ports from a client device; and
   with the target device, in response to the connection request from the client device to the first port;
   determining whether another port of the plurality of ports of the target device has a higher quality than the first port; and
   based on a determination that the other port has a higher quality than the first port, rejecting the connection request from the client device at the first port of the target device and instructing the client device to connect to the other port of the target device.

14. The method of claim 13, wherein monitoring the quality of each of the plurality of ports includes monitoring at least one of an amount of traffic, an error rate, a link speed, a bandwidth, and a transmission rate of each of the plurality of ports.

15. The method of claim 13, comprising:
   in response to the connection request from the client device to the first port:
   based on a determination that the first port has the best quality of the plurality of ports, accepting the connection request to the first port;
   based on a determination that connection to the other port is unsuccessful, accepting the connection request to the first port; and
   based on a determination that the quality of the first port falls below the quality of the other port, instructing the client device to disconnect from an established connection with the first port and connect to the other port.

16. The method of claim 13, wherein monitoring of the quality of each of the plurality of ports of the target device does not rely on monitoring of the quality of each of the plurality of ports by the client device.

17. A non-transitory machine-readable storage medium encoded with instructions executable by a processor of a target device to:
   monitor quality metrics for each of a plurality of ports of the target device;
   receive a connection request to a first port of the plurality of ports of the target device from a client device; and
   in response to the connection request to the first port of the target device from the client device:

determine whether another port of the plurality of ports of the target device has a better quality metric than the first port, for at least one of the quality metrics; and based on a determination that the other port has a better quality metric than the first port, for at least one of the quality metrics, reject the connection request at the first port of the target device from the client device and instruct the client device to connect to the other port of the target device.

18. The non-transitory machine-readable storage medium of claim 17, wherein the quality metrics include at least one of amount of traffic, error rate, link speed, bandwidth, and transmission rate, and the non-transitory machine-readable storage medium encoded with instructions executable by the processor to:

in response to the connection request from the client device at the first port:
based on a determination that the first port has the best quality of the plurality of ports based on at least one of the quality metrics, accept the connection request to the first port;

based on a determination that a connection attempt by the client device to the other port is unsuccessful, accept the connection request to the first port; and based on a determination that the quality of the first port becomes lower than the quality of the second port based on the at least one of the quality metrics, instruct the client device to disconnect from the first port and connect to the other port.

19. The non-transitory machine-readable storage medium of claim 14, wherein the quality metrics include at least one of amount of traffic, error rate, link speed, bandwidth, or transmission rate.

20. The non-transitory machine-readable storage medium of claim 14, wherein the instructions to monitor the quality metrics for each of the plurality of ports do not rely on the client device to monitor the plurality of ports.

* * * * *